United States Patent
Rumer

(10) Patent No.: US 6,606,231 B2
(45) Date of Patent: Aug. 12, 2003

(54) INTEGRATED TELEPHONY SUBSCRIBER LINE PROTECTION AND FILTER DEVICE

(75) Inventor: Mark Rumer, Santa Barbara, CA (US)

(73) Assignee: Occam Networks, Santa Barbara, CA (US)

( * ) Notice: Subject to any disclaimer, the term of this patent is extended or adjusted under 35 U.S.C. 154(b) by 0 days.

(21) Appl. No.: 10/056,934

(22) Filed: Oct. 24, 2001

(65) Prior Publication Data

US 2003/0076637 A1 Apr. 24, 2003

(51) Int. Cl.$^7$ .................................................. H02H 3/22
(52) U.S. Cl. .................... 361/119; 361/18; 361/118; 361/104; 361/106
(58) Field of Search ....................... 361/54, 119, 124; 375/412, 331

(56) References Cited

U.S. PATENT DOCUMENTS 5,084,691 A  * 1/1992 Lester et al. ............... 337/166
5,490,215 A  * 2/1996 Pelegris .................... 361/110
5,831,324 A  * 11/1998 Bang ........................ 257/508
6,040,972 A  * 3/2000 Takeuchi ................... 361/106
6,298,134 B1 * 10/2001 Curry ...................... 379/399.01

* cited by examiner

Primary Examiner—Brian Sircus
Assistant Examiner—Boris Benenson
(74) Attorney, Agent, or Firm—Blakely Sokoloff Taylor & Zafman LLP

(57) ABSTRACT

A protection device includes a substrate capable of suppressing electromagnetic fields, with a channel formed therein, a current dependent circuit interrupter disposed inside the channel, and voltage management circuitry coupled to the substrate. The voltage management circuitry is electrically coupled to the current dependent circuit interrupter so as to form a crowbar circuit in the presence of overvoltage or undervoltage conditions as determined according to a reference voltage.

15 Claims, 4 Drawing Sheets

US 6,606,231 B2

INTEGRATED TELEPHONY SUBSCRIBER LINE PROTECTION AND FILTER DEVICE

FIELD OF THE INVENTION

This invention relates generally to telephony, and more particularly to telephony protection devices.

BACKGROUND

Telephones are an integral part of global communication. As such, a vast number of telephone lines are connected to private residences and commercial buildings. These lines, made of copper, are extremely conductive, requiring that special consideration be given to hazardous overvoltage and overcurrent conditions and to radiated electromagnetic noise which can interfere with, among others, television and radio. The overvoltage and overcurrent conditions are particularly troublesome since they can cause injury to people and damage to equipment.

These are legitimate concerns due to the hostile environment in which the lines operate. For example, a large number of lines are hung from telephone poles which may be struck by lightning, which can produce hazardous overvoltage and overcurrent in a line connected to a residence or business. Alternatively, the telephone lines are sometimes hung on the same poles as high tension wires. If, for instance, a violent storm or a car crashing into the pole should cause one of the high tension wires to fall onto a phone line, a power cross results, possibly causing overvoltage and overcurrent conditions. Similarly, if someone accidentally cross-wires a phone line to an electrical main, a power cross results. Thus, protection is needed to deal with overvoltage, overcurrent, and radiated electromagnetic interference.

In any telephone subscriber line interface, there are usually two levels of protection. First, the primary protectors deal with the initial overvoltage and overcurrent conditions on the line. These suppression devices are usually either gas tubes or heat coils, and although they take the brunt of the overvoltage and overcurrent, up to 25 kilowatts can still pass through. Thus, secondary protectors are needed to deal with the residual overvoltage and overcurrent conditions, as well as electromagnetic interference. The various embodiments disclosed in the Detailed Description are directed to secondary protection.

Typically, secondary protector circuits are unbounded, having many discrete components and requiring between ¼ square inch and 1 square inch per channel for every interface termination. This can amount to the protection circuit occupying up to half of the area needed for the interface.

SUMMARY

In one embodiment, an apparatus is disclosed which comprises a substrate capable of suppressing electromagnetic fields, with a channel formed therein, a current dependent circuit interrupter disposed inside the channel, and voltage management circuitry coupled to the substrate and electrically coupled to the current dependent circuit interrupter so as to form a crowbar circuit in the presence of overvoltage or undervoltage conditions as determined according to a reference voltage.

In various embodiments, the voltage management circuitry can be directly coupled to the substrate, or the voltage management circuitry can be coupled to a printed circuit board which is coupled to the substrate.

In various embodiments, the substrate is a ferrite material. Among others, the current dependent circuit interrupter can be at least one of a physical link fuse and a self-resettable positive temperature coefficient thermistor. In addition, the voltage management circuitry can be at least one of a symmetrical thyristor arrangement and a zener diode.

The various embodiments described herein advantageously provide for suppression of electromagnetic radiation and protection against overcurrent and overvoltage while reducing the amount of space required for such protection. For example, the various embodiments only require between one sixth to one tenth of the space currently needed by existing secondary protection circuitry.

DESCRIPTION OF THE DRAWINGS

Various embodiments are illustrated by way of example and not by way of limitation in the figures of the accompanying drawings in which like references indicate similar elements. It should be noted that references to "an," "one," or "various" embodiments in this disclosure are not necessarily to the same embodiment, and such references mean at least one.

DETAILED DESCRIPTION

Various embodiments described herein overcome the problems in the existing art described above by providing a single device which incorporates overcurrent protection, overvoltage protection and suppression of electromagnetic radiation. In the following description, for the purposes of explanation, numerous specific details are set forth in order to provide a thorough understanding of the various embodiments. It will be apparent, however, to one skilled in the art that the various embodiments may be practiced without some of the specific details. The following description and accompanying drawings provide various examples for the purposes of illustration. However, these examples should not be construed in a limiting sense as they are merely intended to provide examples of the various embodiments, rather than to provide an exhaustive list of all possible implementations.

Figure 1:
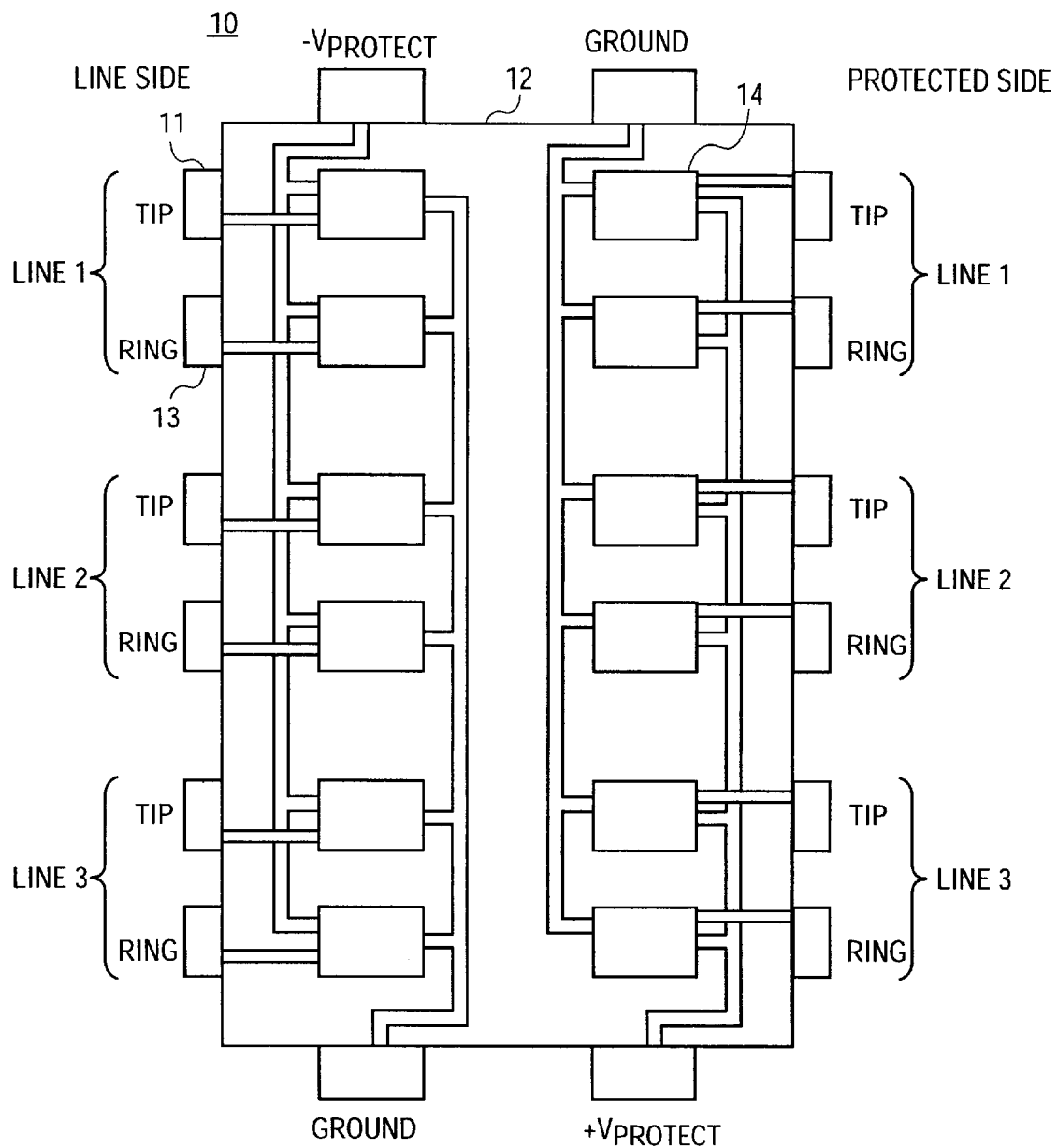
FIG. 1 is a top view of an embodiment with thyristors directly mounted to the substrate.

Referring now to FIG. 1, device 10 is shown according to an embodiment. Device 10 has three connections or interfaces for telephone lines which may enter device 10 on the Line side (e.g., the portion of the line located after the primary protector but before the secondary protector) and exit device 10 on the Protected side (e.g., the portion of the line located after the secondary protector, here device 10).

Each telephone line interface has a Tip connection 11 and a Ring connection 13. The physical subscriber connects to device 10 on the Protected side.

Substrate 12 is capable of suppressing electromagnetic fields. Thus, substrate 12 acts as a choke to block radiated emissions, such as noise from device 10 by way of an impedance to high radio frequency emissions.

Although not shown in FIG. 1, channels are formed within substrate 12, and Tip and Ring connections 11 and 13 run through these channels. Each of these channels has a current dependent circuit interrupter disposed therein which acts to protect against overcurrent. For example, the current dependent circuit interrupter could be a physical link fuse or a self-resettable positive temperature coefficient thermistor. One advantage of using self-resettable thermistors is that they allow short term energy hits to pass (e.g., induced lightning rather than direct lightning or a power cross).

In addition, voltage management circuitry 14 is coupled directly to substrate 12. It is worth noting that the space needed for device 10 could be further reduced by not using pre-packaged physical thyristors. Rather, the die could be directly coupled to substrate 12 or printed circuit board 16 (See FIG. 2 and accompanying text).

In various embodiments, voltage management circuitry 14 includes a symmetrical thyristor arrangement or a zener diode. As can be seen from FIG. 1, voltage management circuitry 14 is electrically coupled to reference voltage sources, positive Vprotect and negative Vprotect. These reference voltage sources are adapted to meet the requirements of the environment in which device 10 is used.

Moreover, a crowbar circuit effect is formed by voltage management circuitry 14 and the current dependent circuit interrupter once the voltage goes above or below a certain point. For instance, the circuit will shunt to chassis ground through a low impedance path if the voltage level become too high or too low. The crowbar effect is seen when the current dependent circuit interrupter fails due to overcurrent.

In embodiments which utilize thyristors as part of voltage management circuitry 14, small transient events will cause the thyristors to fire (e.g., to shunt), but the current dependent circuit interrupters will not fail. It is more desirable to use a thyristor-based voltage management circuit than a zener diode-based voltage management circuit since zener diodes are not programmable and do not have a low impedance shunt path. As such, circuits with zener diode-based voltage management circuitry would tend not to deal efficiently with repeated events.

It is worth noting that substrate 12 may be made of a channelized piece of a ceramic material, such as alumina or ferrite. One advantage of using ferrite is that ferrite acts as a choke to suppress electromagnetic radiation which may be emitted by or carried through the telephone lines. The ferrite can be any of type 43, 60, 62, or 80. However, the type of ferrite chosen will depend on the desired electromagnetic characteristics of device 10. For instance, different impedances will be required at different operating frequencies.

Figure 2:
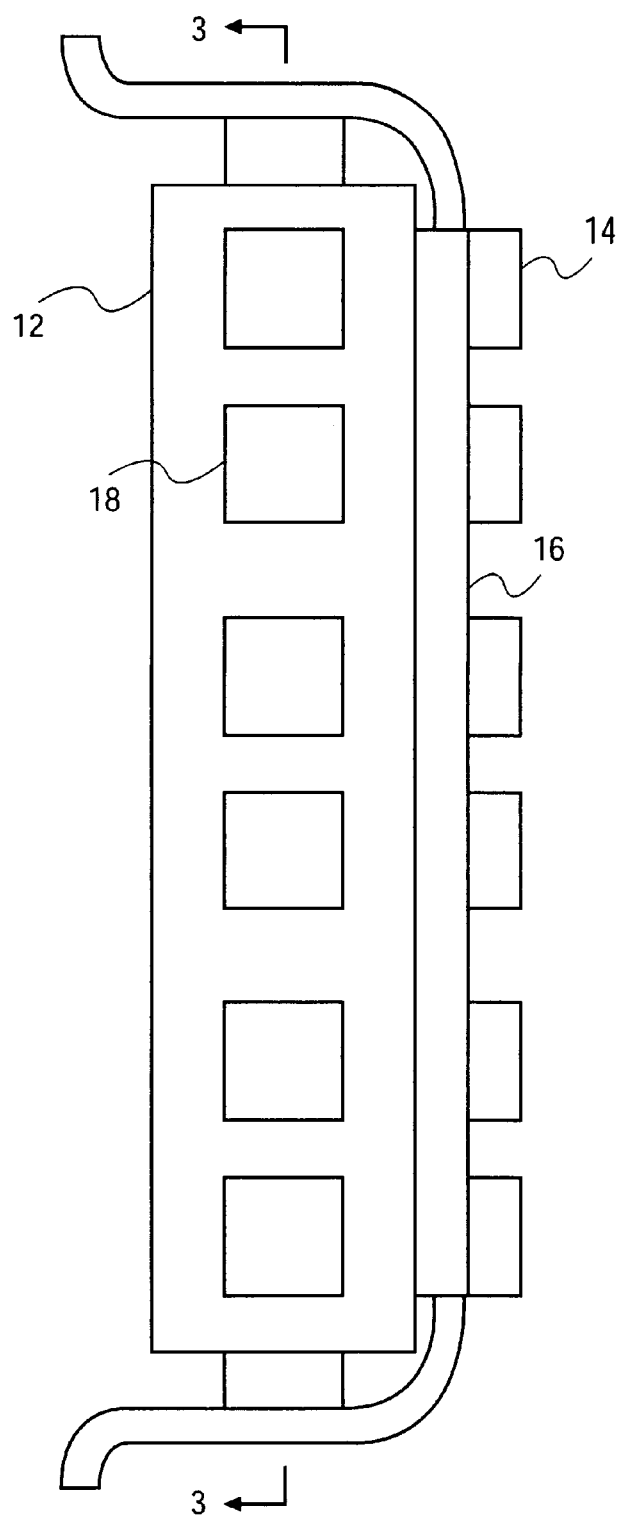
FIG. 2 is a side view of an embodiment with the thyristors mounted on a board, which is mounted to the substrate.

FIG. 2 shows an embodiment in which voltage management circuitry 14 is mounted on printed circuit board 16, which is further coupled to substrate 12. In addition, channels 18 are each configured to have a current dependent circuit interrupter (not shown in FIG. 2) disposed therein.

Figure 3:
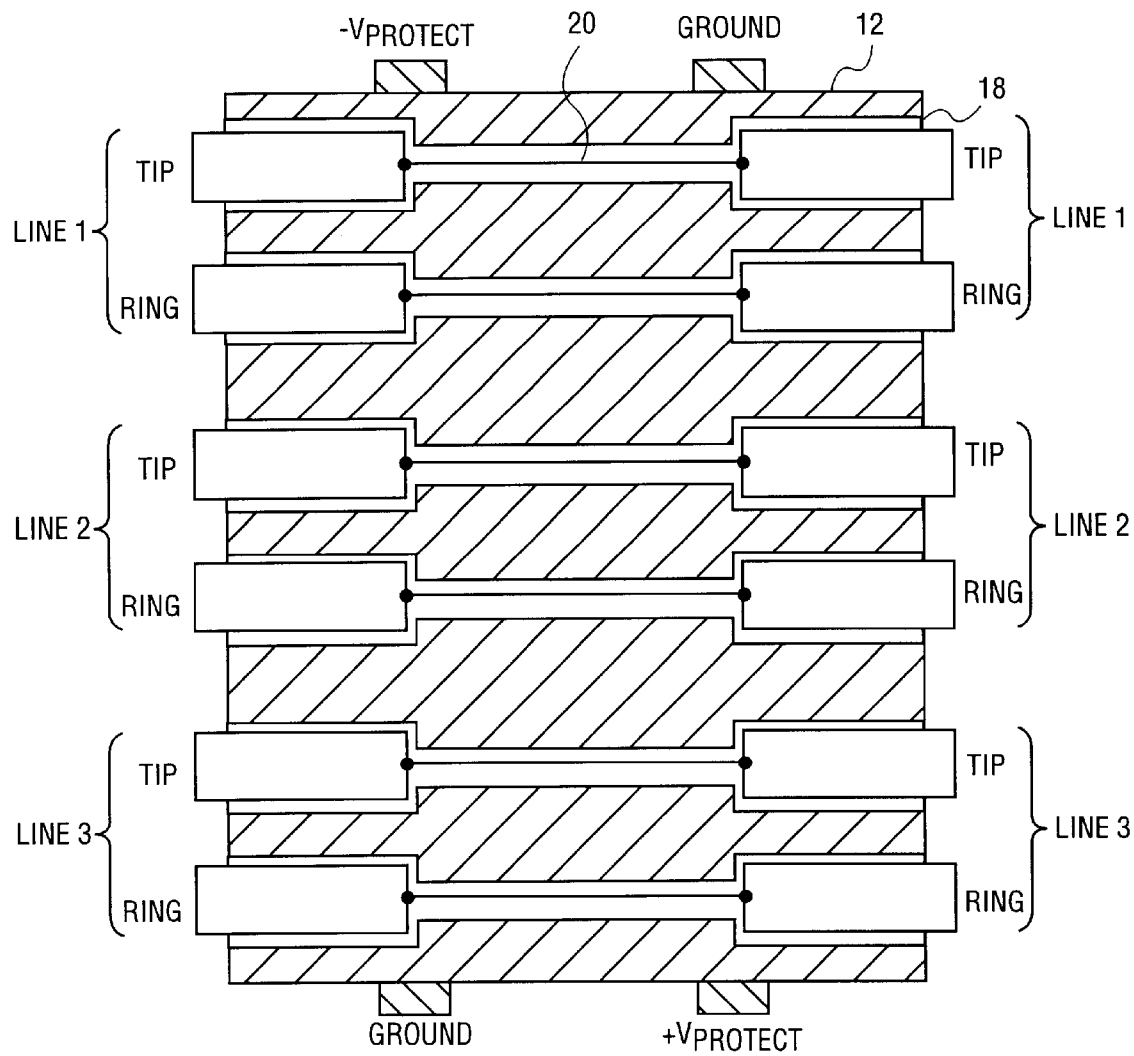
FIG. 3 is a cross-sectional view of the embodiment shown in FIG. 2.

FIG. 3 is a cross-sectional view of the embodiment shown in FIG. 2. As can be seen, current dependent circuit interrupters 20 are shown disposed within channels 18. In this particular embodiment, current dependent circuit interrupters 20 are physical link fuses.

Figure 4:
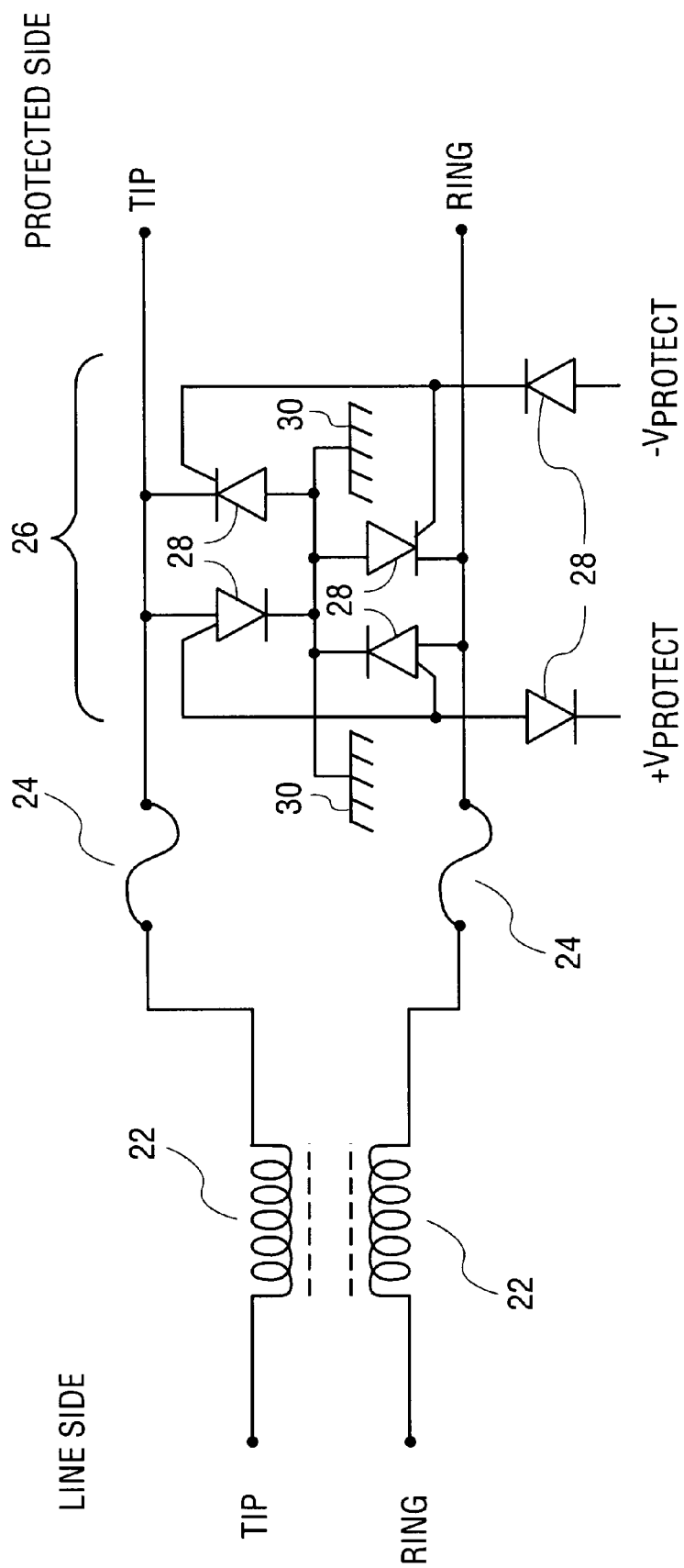
FIG. 4 is a schematic of a protection circuit for a single line.

FIG. 4 shows an electrical schematic for a single line of device 10 of FIG. 1. Specifically, choke 22 acts to suppress electromagnetic radiation from device 10 and is physically embodied as substrate 12, discussed above. Fuses 24 are the current dependent circuit interrupters of the embodiment shown and are disposed within channels formed in substrate 12. As previously discussed, the current dependent circuit interrupters (fuses or self-resettable positive temperature coefficient thermistors) protect against overcurrent conditions. Overvoltage assembly 26 comprises thyristors 28 coupled to reference voltages, positive Vprotect and negative Vprotect, and ground 30 to provide protection against overvoltage conditions. Thyristors 28 are physically embodied as voltage management circuitry 14 of FIG. 1.

It is to be understood that even though numerous characteristics and advantages of the various embodiments have been set forth in the foregoing description, together with details of the structure and function of the various embodiments, this disclosure is illustrative only. Changes may be made in detail, especially matters of structure and management of parts, without departing from the scope of the various embodiments as expressed by the broad general meaning of the terms of the appended claims.

I claim:

1. An apparatus comprising:
    a substrate capable of suppressing electromagnetic fields and having a channel formed therein;
    a current dependent circuit interrupter disposed inside the channel; and
    voltage management circuitry coupled to the substrate and electrically coupled to the current dependent circuit interrupter so as to form a crowbar circuit in the presence of overvoltage conditions as determined according to a reference voltage.

2. The apparatus of claim 1, wherein the voltage management circuitry is disposed on an outer portion of the substrate.

3. The apparatus of claim 2, wherein the voltage management circuitry is directly coupled to the substrate.

4. The apparatus of claim 2, wherein the voltage management circuitry is coupled to a printed circuit board which is coupled to the substrate.

5. The apparatus of claim 1, wherein the substrate comprises a ferrite material such that the channelized substrate with the current dependent circuit interrupter disposed within the channel creates an electromagnetic radiation choke.

6. The apparatus of claim 1, wherein the current dependent circuit interrupter comprises a physical link fuse.

7. The apparatus of claim 1, wherein the current dependent circuit interrupter comprises a self-resettable positive temperature coefficient thermistor.

8. The apparatus of claim 1, wherein the voltage management circuitry comprises a zener diode.

9. The apparatus of claim 1, wherein the voltage management circuitry comprises a symmetrical thyristor arrangement.

10. A device for protecting telephone subscriber line interfaces, each telephone line having a "Tip" connection and a "Ring" connection, the device comprising:
    a substrate capable of suppressing electromagnetic fields, the substrate having multiple channels formed therein;
    a current dependent circuit interrupter disposed inside each of the channels;
    a "Tip" wire interface connected to one of the current dependent circuit interrupters;
    a "Ring" wire interface connected to another of the current dependent circuit interrupters; and an overvoltage assembly, comprising a symmetrical thyristor arrangement, disposed on an outer portion of the substrate and electrically coupled to the "Tip" and "Ring" wire interfaces.

11. The device of claim 10, wherein the overvoltage assembly is directly coupled to the substrate.

12. The device of claim 10, wherein the overvoltage assembly is coupled to a printed circuit board which is coupled to the substrate.

13. The device of claim 10, wherein the substrate comprises a ferrite material such that the channelized substrate with the current dependent circuit interrupter disposed within the channel creates an electromagnetic radiation choke.

14. The device of claim 10, wherein the current dependent circuit interrupter comprises a physical link fuse.

15. The device of claim 10, wherein the current dependent circuit interrupter comprises a self-resettable positive temperature coefficient thermistor.

* * * * *